(12) United States Patent
Srinivasan et al.

(10) Patent No.: US 7,881,815 B2
(45) Date of Patent: Feb. 1, 2011

(54) METHOD AND SYSTEM FOR PROCESS CONTROL

(75) Inventors: Ranganathan Srinivasan, Bangalore (IN); J. Ward MacArthur, Scottsdale, AZ (US); Gobinath Pandurangan, Bangalore (IN); Murugesh Palanisamy, Bangalore (IN); Sriram Hallihole, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 675 days.

(21) Appl. No.: 11/776,785

(22) Filed: Jul. 12, 2007

(65) Prior Publication Data

US 2009/0018671 A1    Jan. 15, 2009

(51) Int. Cl.
    G05B 13/02    (2006.01)
(52) U.S. Cl. .................. 700/31; 700/28; 703/2
(58) Field of Classification Search .......... 700/9, 700/17, 28, 30, 31, 44, 83; 703/2, 4, 12
    See application file for complete search history.

(56) References Cited

U.S. PATENT DOCUMENTS

| | | | |
|---|---|---|---|
| 6,721,609 B1* | 4/2004 | Wojsznis et al. | 700/28 |
| 6,826,521 B1* | 11/2004 | Hess et al. | 703/12 |
| 7,139,623 B2 | 11/2006 | Adams et al. | |
| 7,194,318 B2* | 3/2007 | Attarwala | 700/29 |
| 7,317,953 B2* | 1/2008 | Wojsznis et al. | 700/28 |
| 7,330,804 B2* | 2/2008 | Turner et al. | 703/2 |
| 7,451,004 B2* | 11/2008 | Thiele et al. | 700/28 |
| 7,630,868 B2* | 12/2009 | Turner et al. | 703/2 |
| 2003/0120361 A1* | 6/2003 | Anderson et al. | 700/31 |
| 2005/0071137 A1* | 3/2005 | Selvaraj et al. | 703/6 |
| 2007/0021852 A1 | 1/2007 | Kishore et al. | |
| 2007/0088446 A1 | 4/2007 | Srinivasan et al. | |
| 2007/0100471 A1 | 5/2007 | Kumar et al. | |

FOREIGN PATENT DOCUMENTS

JP    2006-330892    12/2006

OTHER PUBLICATIONS

Stenman, A.; , "Model-free predictive control," Decision and Control, 1999. Proceedings of the 38th IEEE Conference on , vol. 4, no., pp. 3712-3717 vol. 4, 1999.*

* cited by examiner

*Primary Examiner*—Albert Decady
*Assistant Examiner*—Dave Robertson
(74) *Attorney, Agent, or Firm*—Jetter & Associates, P.A.

(57) ABSTRACT

A method and system for process control. The control system can be operably coupled to a processing system. The control system can include control devices operably coupled to the processing system; a modeling module to provide a linear model based at least in part on the processing system; a computational module to provide controller algorithms associated with the control devices; a user interface module to present at a user interface controller information based at least in part on the linear model and the controller algorithms; and a separate coordination module for establishing communication between the modeling module, the computational module and the user interface module. One or more control signals can be provided to at least one of the control devices for controlling the processing system. In one embodiment, the modeling module can generate the linear model from a non-linear process.

20 Claims, 6 Drawing Sheets

METHOD AND SYSTEM FOR PROCESS CONTROL

FIELD OF THE INVENTION

This disclosure relates generally to process control systems and more specifically to a method and system for process control.

BACKGROUND

Processing facilities, such as manufacturing plants, chemical plants and oil refineries, are typically managed using process control systems. Valves, pumps, motors, heating/cooling devices, and other industrial equipment typically perform actions needed to process materials in the processing facilities. Among other functions, the process control systems often manage the use of the industrial equipment in the processing facilities.

In conventional process control systems, controllers are often used to control the operation of the industrial equipment in the processing facilities. The controllers can typically monitor the operation of the industrial equipment, provide control signals to the industrial equipment, and/or generate alarms when malfunctions are detected. Advanced controllers can often use model-based control techniques to control the operation of the industrial equipment. Model-based control techniques typically involve using models to analyze input data, where the models identify how the industrial equipment should be controlled based on the input data being received.

Process control systems typically include one or more process controllers and input/output (I/O) devices communicatively coupled to at least one workstation and to one or more field devices, such as through analog and/or digital buses. The field devices can include sensors (e.g., temperature, pressure and flow rate sensors), as well as other passive and/or active devices. The process controllers can receive process information, such as field measurements made by the field devices, in order to implement a control routine based upon the control model. Control signals can then be generated and sent to the industrial equipment to control the operation of the process.

Many process control systems also include an application station. The application station can execute a software application that performs various process functions, such as maintenance management functions, diagnostic functions, monitoring functions, and safety-related functions in the process control system, such as based on the control model.

The software application is typically customized to the particular process being controlled. The process control system application, database service, and runtime service are highly dependent on one another. Changes to the common data components can necessitate the client application to be rebuilt. Process control software developers are required to closely coordinate the development of database, runtime, and system software so that the software is built and released in a unified manner. Also, since the modeling application is integrated into the particular control software, reuse of effective models is often limited because of the differences in the particular control that is being exerted on different processing facilities.

Accordingly, there is a need for a method and system for non-linear process control that is flexible. There is a further need for such a method and system that facilitates and/or expedites development of the control technique.

SUMMARY

The Summary is provided to comply with 37 C.F.R. §1.73, requiring a summary of the invention briefly indicating the nature and substance of the invention. It is submitted with the understanding that it will not be used to interpret or limit the scope or meaning of the claims.

A method and system for process control is provided. The method and system can include a modeling module and a computational module that are in communication with a user interface and one or more control devices by way of a coordination module. The modeling module can provide a model for the process and the computational module can provide control algorithms associated with the control devices. The use of modules and, in particular, the coordination module, can provide flexibility in developing and implementing the control over the process. The method and system can implement control over non-linear systems, such as through linear models, linear piecewise models and/or non-linear models.

In one exemplary embodiment of the present disclosure, a method of controlling a non-linear process is provided. The method can include providing a model based at least in part on the non-linear process, with the model being provided by a modeling module of a control system; providing controller algorithms associated with control devices of the non-linear process, with the controller algorithms being provided by a computational module of the control system; presenting on a user interface controller information based at least in part on the model and the controller algorithms, with the user interface being provided by a user interface module; placing the modeling module, the computational module and the user interface module in communication using a coordination module of the control system; and controlling the non-linear process by sending one or more control signals from the coordinating module to at least one of the control devices.

In another exemplary embodiment, a control system operably coupled to a processing system is provided. The control system can include control devices operably coupled to the processing system; a modeling module to provide a model based at least in part on the processing system; a computational module to provide controller algorithms associated with the control devices; a user interface module to present at a user interface controller information based at least in part on the model and the controller algorithms; and a coordination module for establishing communication between the modeling module, the computational module and the user interface module. One or more control signals can be provided to at least one of the control devices for controlling the processing system. The modeling module and the computational module can operate utilizing different application platforms.

In a further exemplary embodiment, a computer-readable storage medium comprising computer-readable program instructions for controlling a non-linear process is provided. The program can include program instructions for causing a computer to query a modeling module for a model of the non-linear process; program instructions for causing the computer to query a computational module for controller algorithms associated with one or more control devices of the non-linear process; program instructions for causing the computer to present on a user interface controller information based at least in part on the model and the controller algorithms; and program instructions for causing the computer to send one or more control signals to at least one of the one or more of the control devices to implement control of the non-linear process.

The technical effect includes, but is not limited to, allowing for interchangeable platforms for development of the process control that results in an easier and/or expedited development process. The technical effect further includes, but is not limited to, decentralizing architecture that provides for reuse of components for the process control system.

The above-described and other features and advantages of the present disclosure will be appreciated and understood by those skilled in the art from the following detailed description, drawings, and appended claims.

DETAILED DESCRIPTION OF THE INVENTION

Figure 1:
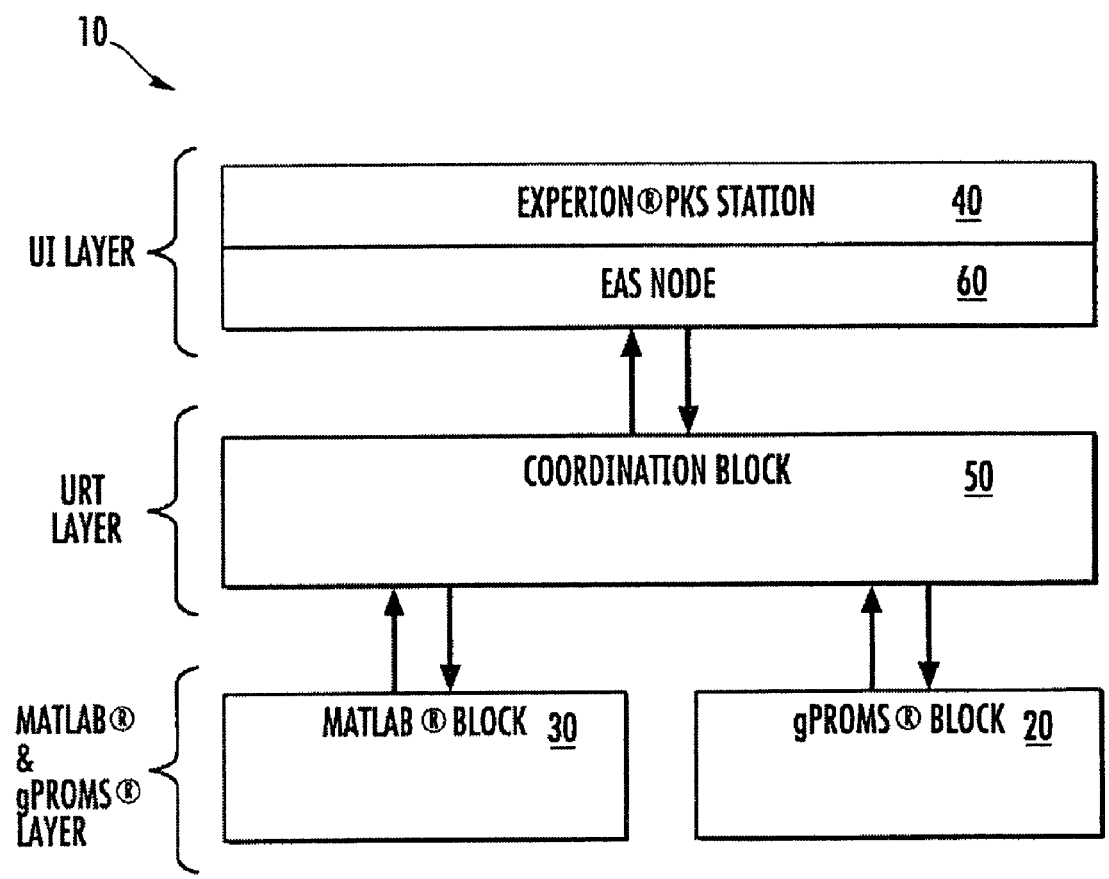
FIG. 1 is a schematic illustration of an exemplary system for process control according to an embodiment of the present invention.

Referring to the drawings, and in particular to FIG. 1, a control system is shown and generally represented by reference numeral 10. Control system 10 can be used with various processing facilities and various processes, such as manufacturing processes, chemical plants and oil refineries. The particular type of facility and the particular type of process that is to be controlled is not intended to be limited. Control system 10 can provide for control of a multi-variable process. In one embodiment, the control system 10 can be applied to a non-linear process, but the present disclosure also contemplates the use of the control system for implementing control in linear processes.

Control system 10 can include a modeling module 20, a computational module 30, a user interface module 40, a coordination module 50, and an application server 60. The present disclosure also contemplates the use of other modules, including a plurality of modules for one or more of the modeling module 20, the computational module 30, the user interface module 40, and the coordination module 50. For example, the modeling module 20 can be comprised of several different modules to develop models based upon different events or potential events, or the user interface module 40 can be comprised of several different modules for displaying different information associated with the control process.

Modeling module 20 can be used for providing and/or generating a model representative of the process being controlled. In one embodiment, modeling module 20 can generate a linear model from a non-linear process being controlled. The linear model can be of various types. In one embodiment, the linear model can be a state space model. However, other models are also contemplated, such as neural or fuzzy models. Modeling module 20 can be various modeling platforms, such as gPROMS® (as shown in FIG. 1) or other platforms, including customized applications.

In one embodiment, the modeling module 20 can be used to generate a reference trajectory for a grade transition of a product, such as an optimum trajectory. For example, where a change of product specifications is desired, a reference trajectory can be generated based upon a profile of particular variables associated with the process, and the control process can then be optimized by tracking the reference trajectory.

Computational module 30 can be used for providing and/or generating controller algorithms that are associated with control devices 250 (shown in FIG. 2) operably coupled to the process facility and integrated into the process being controlled. Computational module 30 can be various computational platforms, such as MATLAB®, Robust Multivariable Predictive Control Technology (RMPCT) engines or other application or native platforms, including customized applications.

User interface module 40 can be used for providing a user interface for the control process. The user interface can present various control information, including operator displays corresponding to process parameters, and trends for controller inputs and/or outputs. The particular type of controller information presented can vary based upon the type of processing facility and the type of process being controlled, such as feed rates and product molecular weights in a polymerization process. The user interface can also receive various commands or other inputs from the operator, such as a prediction request for proposed operating conditions or other proposed events. In one embodiment, the user interface module 40 can provide for customization of the presentation and/or retrieval of information, inputs, outputs, and the like. For example, the user interface module 40 can provide for the operator to build their own displays of the controller information so as to reduce the time and cost of the user interface development for the control system 10. Previously developed user interfaces can be implemented through use of the user interface module 40 to further facilitate development of the control system 10. The user interface module 40 can be various platforms, such as a Honeywell Experion® Process Knowledge System (EPKS) station, utilizing HMIweb. In one embodiment, the user interface can be adjusted through use of the user interface module 40 while the control system 10 is on-line.

The modeling module 20, the computational module 30, and the user interface module 40 can be coupled by way of the coordination module 50. The coupling can be through use of various components and techniques, including hardwire, optical and/or wireless couplings. In one embodiment, the coordination module 50 can be separate hardware from the other modules. In another embodiment, the coordination module 50 can be the same hardware as the modules but different software.

The coordination module 50 can provide a real-time environment for coupling of the other modules or components of the control system 10. The coordination module 50 can be a central coordinating block for the control system 10. The coordination module 50 can interact with the user interface module 40 (e.g., through use of HMIWeb) to retrieve operator inputs and/or display the data to the operator user, including trends for controller data. In one embodiment, based on the user inputs, the coordination module 50 can trigger the modeling module 20 and the computational module 30.

The coordination module 50 can include associated writeable memory, which is preferably non-volatile, to serve as a data repository for various variables, data or other information, such as storing operational variables that have been determined based upon operational parameters that were measured or otherwise sensed from the process being controlled. Coordination module 50 can be various processing platforms and can include various interfaces and operate according to various protocols for communication with the other modules. In one embodiment, the modeling module 20 and the computational module 30 are run on different application or native platforms. The coordination module 50 can communicate with both of the different platforms for performing the control process. In one embodiment, the coordination module 50 can include associated memory for storing controller parameters and/or model parameters as points associated with the user interface of the user interface module 40. In another embodiment where the user interface module 40 comprises the Honeywell EPKS station, storing the controller parameters and/or model parameters as points allows for the use of HMIweb graphics.

The application server 60 can provide for the connection between the coordination module 50 and the user interface module 40. In one embodiment, the application server 60 can map different variables generated between the coordination module 50 and the user interface module 40. The application server 60 can also be the interface with the processing facility or other systems being controlled.

Figure 2:
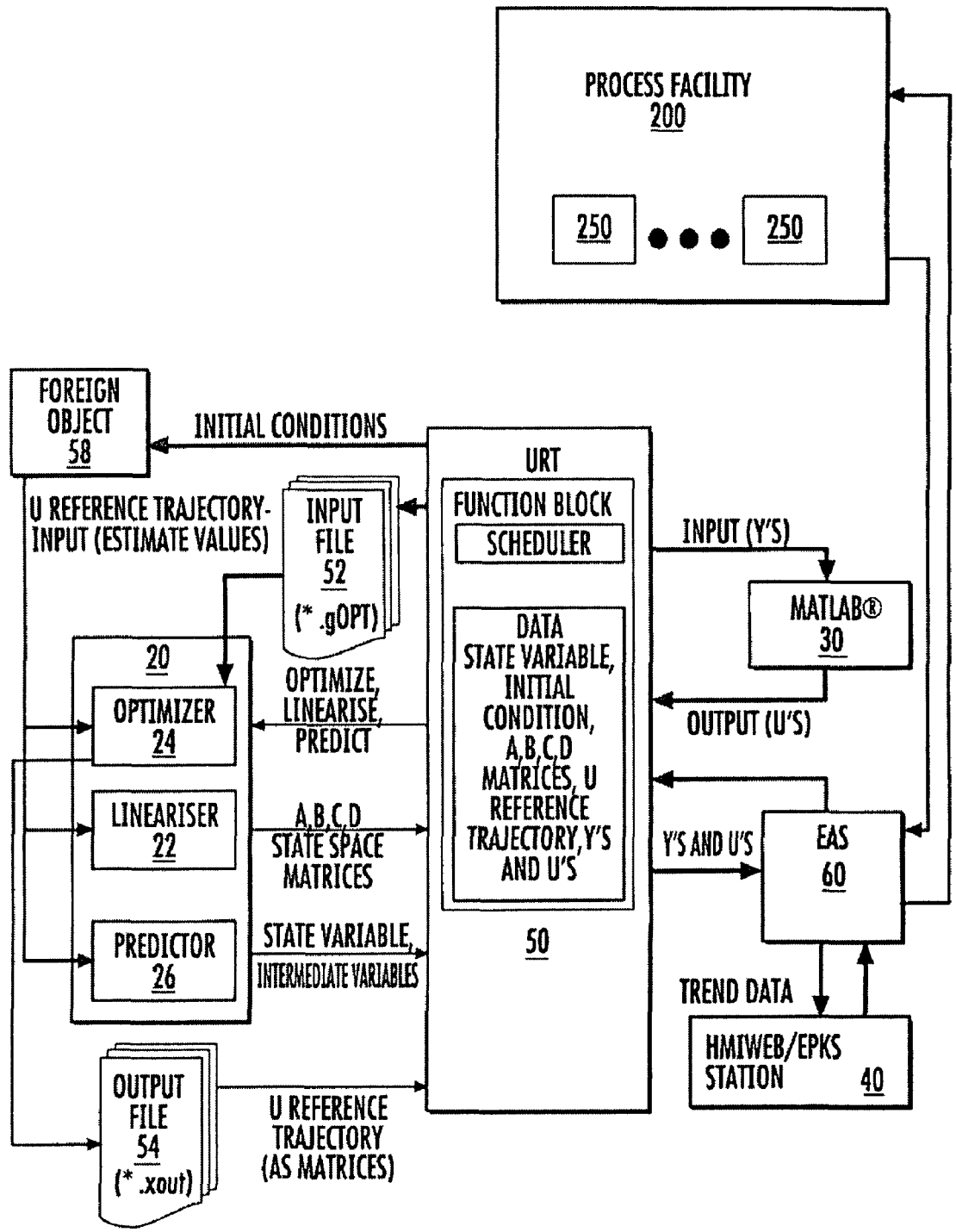
FIG. 2 is a schematic illustration of another exemplary system for process control according to an embodiment of the present invention coupled to a processing facility.

Referring to FIG. 2, where similar features are labeled by the same reference numerals as in FIG. 1, system 10 is shown coupled to a processing facility 200 by way of the application server 60. The present disclosure also contemplates other components and techniques for coupling the control system 10 to the processing facility 200. For example, although not shown in FIG. 2, an intermediary component, such as an interface module can be disposed between the application server 60 and the processing facility 200.

The processing facility 200 can have one or more control devices 250 integrated into the process. The control devices 250 can be various devices, including valves, pumps, motors, heating/cooling devices, and other industrial equipment, as well as sensors (e.g., temperature, pressure and flow rate sensors), and other passive and/or active devices. The present disclosure is not intended to be limited by the type of control devices that are used to implement the control of the process, and can include a variety of devices and combinations of devices, such as a sub-system to adjust pressure and/or temperature in a portion of the process.

The modeling module 20 can have a modeling tool 22, an optimizer 24, and a predictor 26. In one embodiment, modeling tool 22 is a lineariser (as shown in FIG. 2) that can provide or otherwise generate a linear model (e.g., a state space model), such as from a non-linear process, at the request or query from the coordination module 50. In another embodiment, lineariser 22 can provide or otherwise generate a model that is piece-wise linear. In yet another embodiment, modeling tool 22 can generate a non-linear model.

Optimizer 24 can optimize the control of the process, such as based at least in part on one or more operational variables that are generated from operational parameters, including measurements taken from control devices 250 (e.g., sensors), as well as based upon a model for the process. For example, an operator can request controller information related to a specific event, such as the changing of a product. The optimizer 24 can determine the optimum control conditions (e.g., minimization of time or cost) for implementation of the specific event.

Predictor 26 can predict a state of the process based at least in part on one or more proposed variables, the model and the controller algorithms. For example, an operator can request or query a prediction for the state of the process if run at a different flow rate, pressure and/or temperature. Through user interface module 40, control information can be displayed associated with the predicted state, such as product specifications (e.g., average molecular weight in the case of a polymerization process).

In one embodiment, input files 52 can be provided by the coordination module 50 to the modeling module 20. The input files 52 can be of various formats, such as *.gOPT files if gPROMS® is the modeling platform for module 20, and can include various data, such as state variables, initial conditions, reference trajectory, system matrices, control matrices, output matrices, feed-forward matrices, and others. Output files 54 can be provided by the modeling module 20 to the coordination module 50. The output files 54 can be of various formats, and can include various data, such as state space matrices, state variables, intermediate variable and others. The coordination module 50 can retrieve data from other sources, such as state variable initial conditions from a foreign object 58 that can be linked to a database. The coordination module 50 can also perform scheduling functions for queries and the like, such as retrieving data and models.

Figure 3:
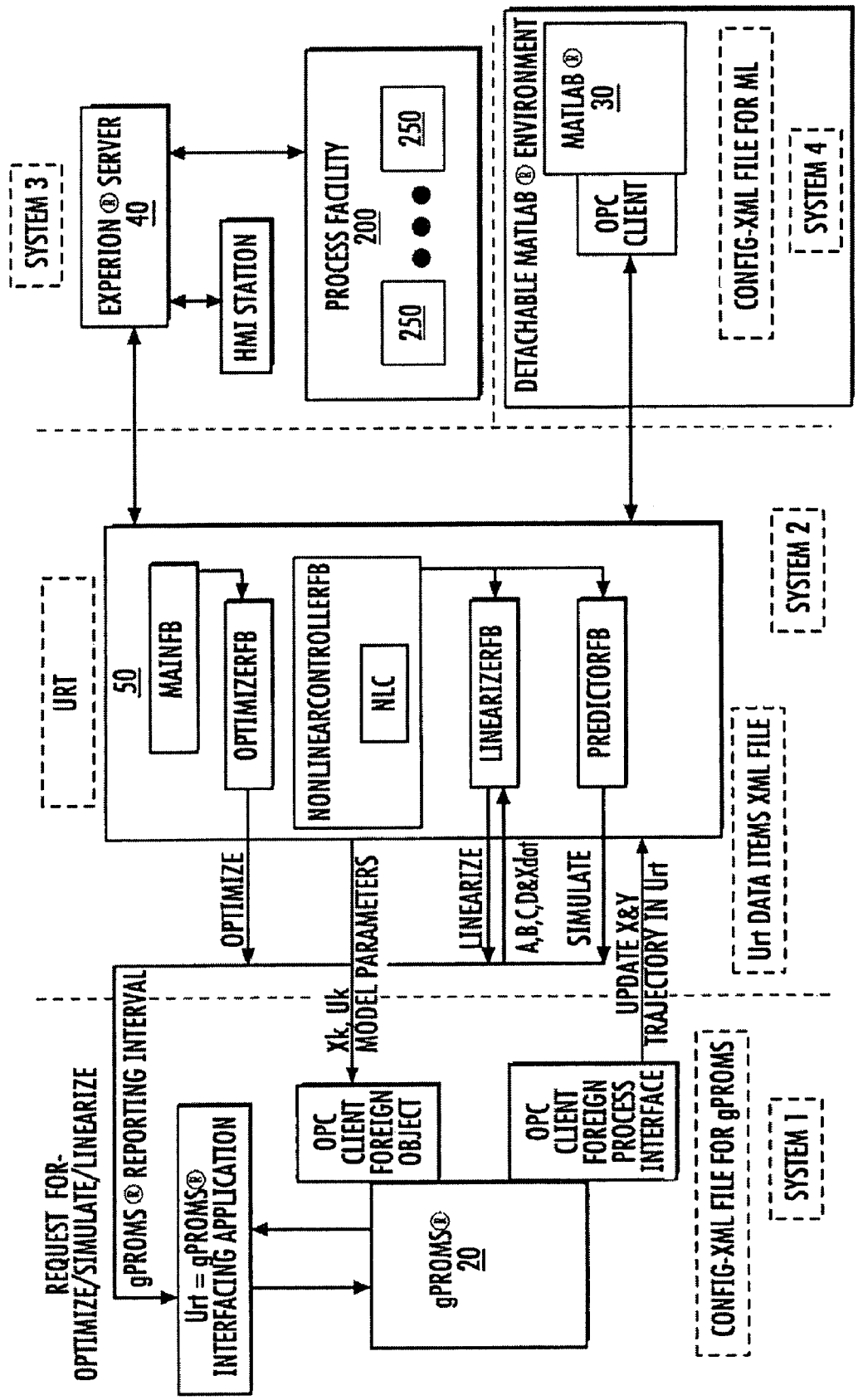
FIG. 3 is a schematic illustration of another exemplary system for process control according to an embodiment of the present invention coupled to a processing facility.

Referring to FIG. 3, another exemplary embodiment of system 10 is shown with the modeling module 20, the computational module 30, and the user interface module 40 coupled by way of the coordination module 50. In this embodiment, the control system 10 has four separate systems 1-4 which are in communication with each other through the coordination module 50. The user interface module, such as the Experion® server can communicate directly with the process facility 200 and the coordination module 50. Modeling functions, such as the optimizing, predicting and/or linearising can be performed by the coordination module 50, while the modeling module 20 can utilize a modeling platform, such as gPROMS® to provide updated trajectory variables to the coordination module 50. Various formats can be used for maintaining, manipulating and/or communicating data, such as XML files.

Figure 4:
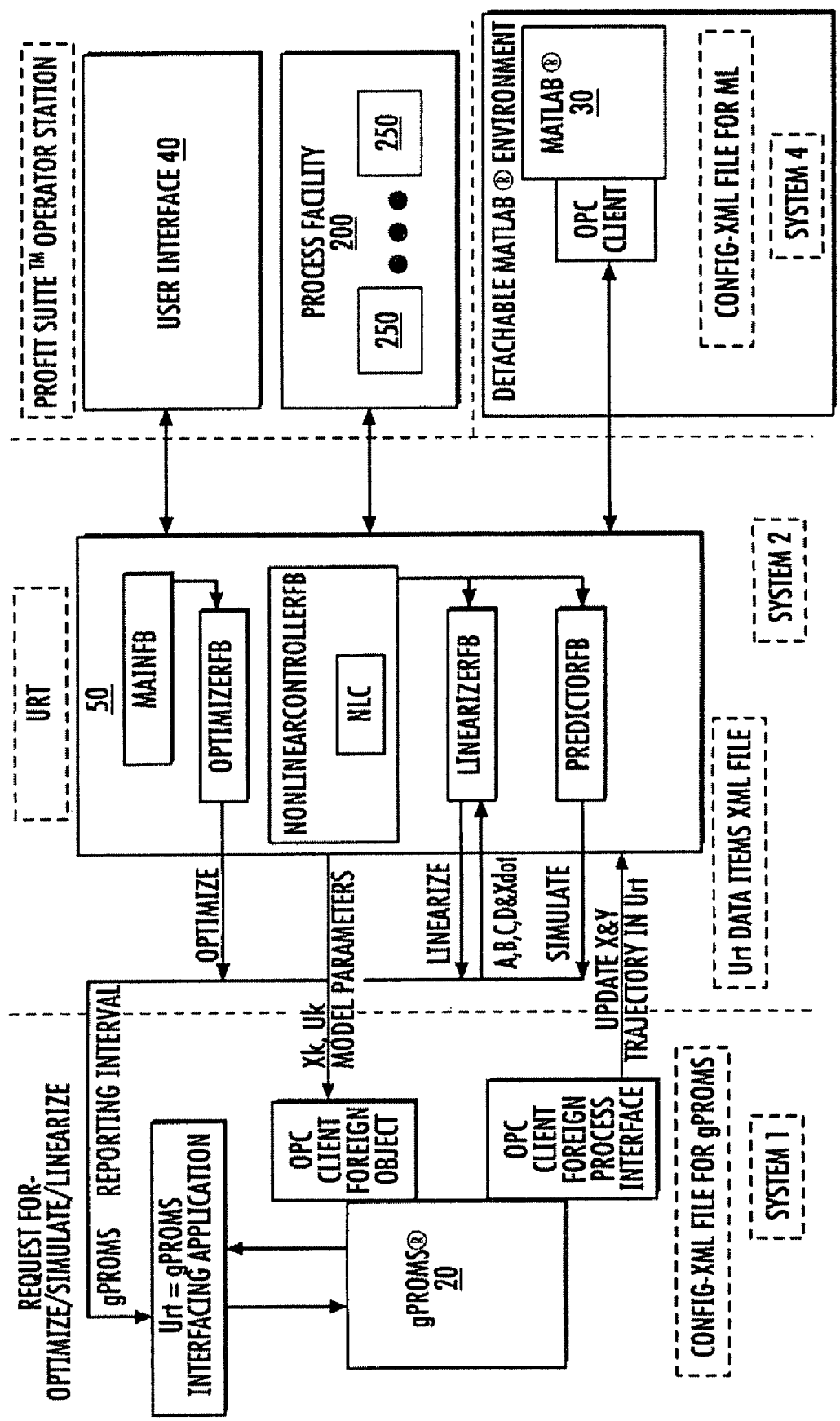
FIG. 4 is a schematic illustration of another exemplary system for process control according to an embodiment of the present invention coupled to a processing facility.

Referring to FIG. 4, another exemplary embodiment of system 10 is shown with the modeling module 20, the computational module 30, and the user interface module 40 coupled by way of the coordination module 50. In this embodiment, the control system 10 also has four separate systems 1-4 which are in communication with each other through the coordination module 50. The user interface module can be a Profit Suite™ Operator Station that communicates indirectly with the process facility 200 through the coordination module 50. Modeling functions, such as the optimizing, predicting and/or linearising can be performed by the coordination module 50, while the modeling module 20 can utilize a modeling platform, such as gPROMS® to provide updated trajectory variables to the coordination module 50. Various formats can be used for maintaining, manipulating and/or communicating data, such as XML files.

Figure 5:
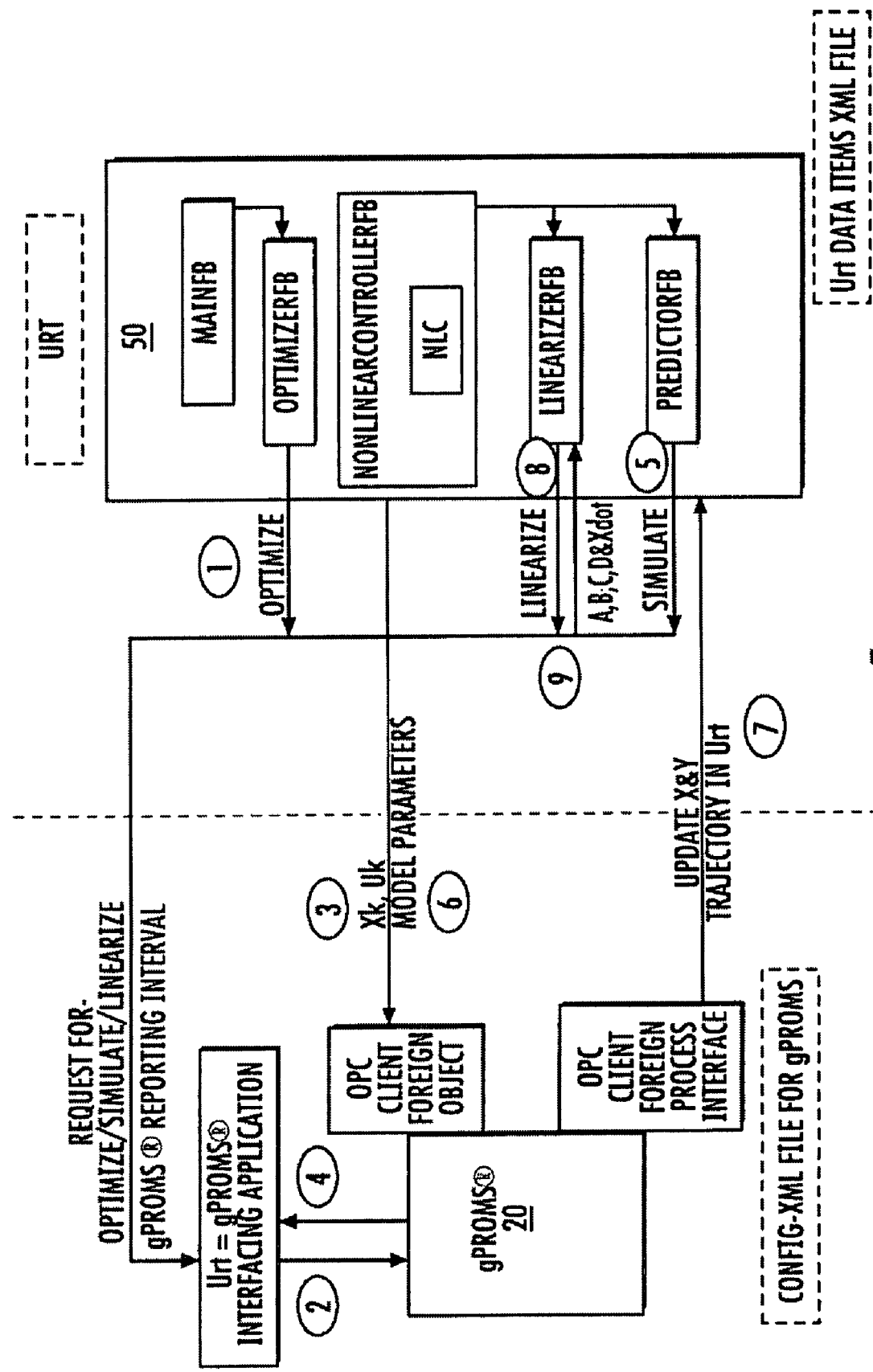
FIG. 5 is a schematic illustration of another exemplary system for process control according to an embodiment of the present invention.

Referring to FIG. 5, another exemplary embodiment of system 10 is shown with the modeling module 20 coupled with the coordination module 50. Modeling functions, such as the optimizing, predicting and/or linearising can be performed by the coordination module 50, while the modeling module 20 can utilize a modeling platform, such as gPROMS® to provide updated trajectory variables to the coordination module 50. Various formats can be used for maintaining, manipulating and/or communicating data, such as XML files.

An interfacing application can be used with the modeling module 20 that can be a wrapper for gPROMS® to interface with the coordination module 50 as shown in FIG. 5. In one embodiment, all the communication between the modeling module 20 and the coordination module 50 would pass through this application as an intermediate. A foreign object can be used for supplying initial conditions (e.g., state variables) for gPROMS® using OPC client to read data from the coordination module, as in the example of FIG. 5. A Foreign Process Interface can be used to send gPROMS® simulation results to the coordination module 50 using the OPC client.

An exemplary sequence of data communication or operations is shown by sequences 1 through 9 of FIG. 5. However, it should be understood that other sequences of data communication or operations are contemplated by the present disclosure. In sequence 1, there can be a call to gPROMS® for optimization. The input and output can be flat files. In sequence 2, the optimize call from the coordination module 50 can be passed to gPROMS® by the interfacing application. In sequence 3, gPROMS® can use the foreign object to obtain the initial conditions for optimization activity. The optimize operation can be completed at sequence 4. In sequence 5, there is a call to gPROMS® simulation. The interfacing application can forward the call to gPROMS® from the coordination module 50. In sequence 6, gPROMS® can receive or retrieve the initial conditions from the coordination module 50 for the simulation activity. gPROMS® can use the foreign process interface to update the simulation results to the coordination module 50 in sequence 7. There can be a call to the gPROMS® lineariser in sequence 8. The interfacing application can forward the call to gPROMS®. The results of the gPROMS® linearization can be sent back to the coordination module 50 by the interfacing application in sequence 9.

Figure 6:
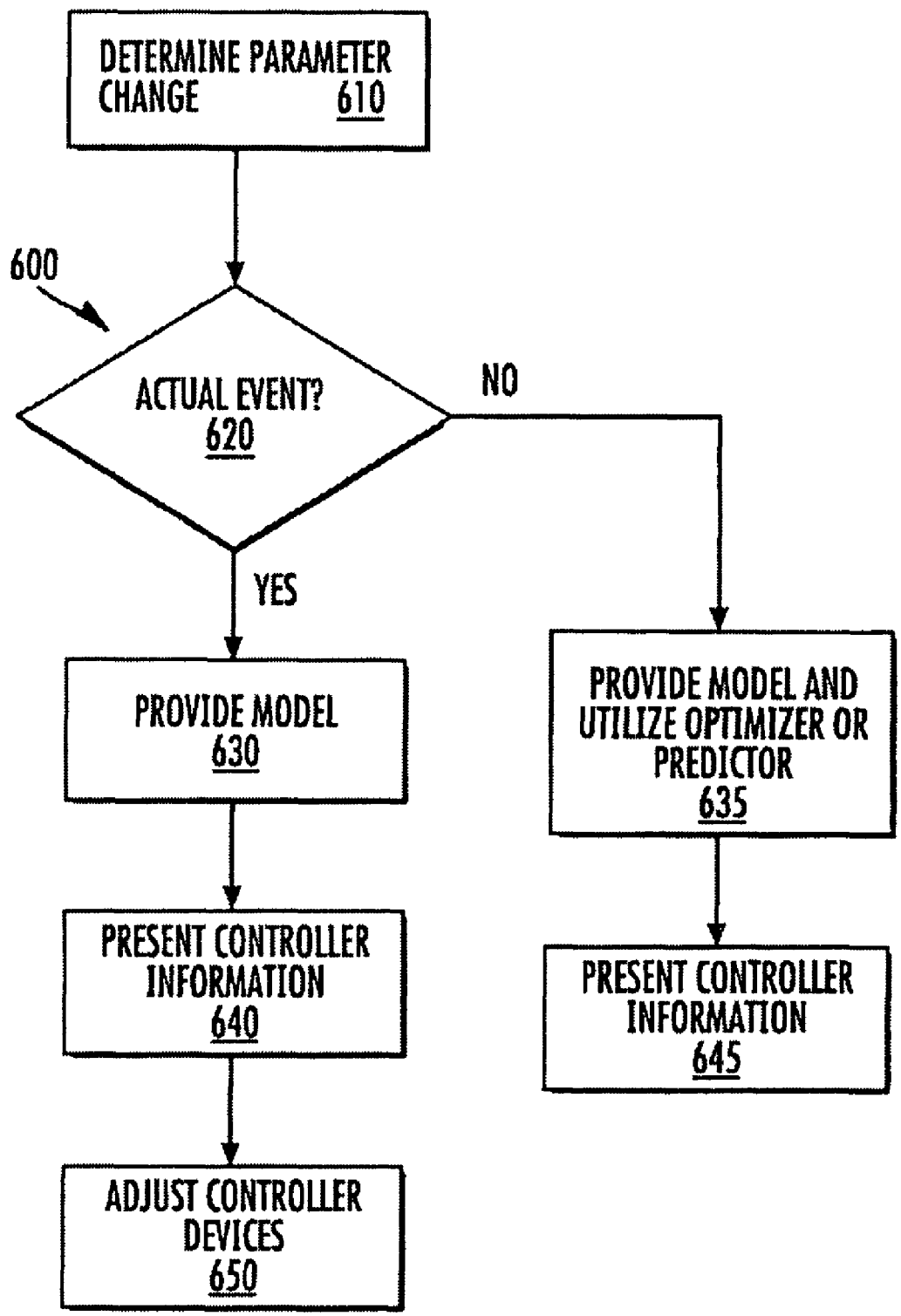
FIG. 6 is a flow chart illustrating an exemplary method for process control according to an embodiment of the present invention using the systems of FIGS. 1 through 5.

Referring to FIG. 6, a method for process control is shown and generally represented by reference numeral 600. The description of the method 600 is with respect to the features of system 10 as illustrated by way of example in FIGS. 1 and 2. In step 610, the control system 10 can determine if there has been a parameter change requiring analysis. The parameter change can be any event, either real or proposed, that requires use of the various modules (e.g., modeling module 20 and computation module 30) to provide information and/or adjust the control for the processing facility 200. In step 620, control system 10 can determine if the change is an actual event.

If an actual event has occurred, then the coordination module 50 can query the modeling module 20 for a model representing the current process. In one embodiment the model is a linear or piecewise linear model, but non-linear models may also be provided. In step 630, the modeling module 20 can generate a model. Based at least in part on the model, as well as controller algorithms associated with the model that were generated by the computational module 30, the coordination module 50 can present controller information to the user interface module 40, as in step 640. For example, where an event has occurred that requires an increase in the amount of a particular chemical component to be added to the reactant to maintain a desired specification, the controller information can display the need for a flow rate increase of the particular chemical composition.

In step 650, one or more of the controller devices 250 can be adjusted to implement a particular control technique that has been determined based upon the event, the model and the controller algorithms. In one embodiment, the adjustment can be in response to receipt of a confirmation signal sent from the operator based on receipt of the controller information described with respect to step 640. Other adjustment techniques can also be used, such as automatically making certain adjustments that fall within a first category of adjustments and requiring confirmation of the adjustment for certain adjustments that fall within a second category of adjustments.

If an actual event has not occurred, then the coordination module 50 can query the modeling module 20 for a model (e.g., linear, piece-wise linear or non-linear) representing the process as proposed by the operator (e.g., a change in one or more operating parameters or a change of the product). Determination of the occurrence of an event can be done by various techniques and components, including monitoring through sensors or distinguishing operator inputs from process inputs.

In step 635, the modeling module 30 can provide or otherwise generate the model (e.g., linear, piecewise linear or non-linear) and then utilize the optimizer 24 or the predictor 26 for generating controller information associated with the proposed state of the process. Based at least in part on the model, as well as controller algorithms associated with the model that were generated by the computational module 30, the coordination module 50 can present the controller information to the user interface module 50, as in step 645. For example, where an operator desires to change a product to have different specifications (e.g., different ratio of chemical components or different average molecular weight), the user interface module 40 can present controller information associated with the controller device adjustments that would optimize the change (e.g., reduce time or losses). As another example, where an operator desires to know the impact of an increased temperature for mixing of chemical components, the user interface module 40 can present controller information associated with the resulting product (e.g., product specifications).

Control system 10 can provide a flexible software architecture for rapid development of a controller product, such as a non-linear controller that utilizes a linear model. In one embodiment, the controller device execution can take place in the computational module 30 or in the coordination module 50. Control system 10 can provide for the operator to develop models and/or algorithms in their native platforms through use of the modeling module 20 and/or the computational module 30, respectively. The native or programming platforms can be different, such as using different programming languages or being distinct software. For example, the MATLAB® environment is often used for developing controller and computational algorithms and is a distinct application platform from the gPROMS® modeling tool.

Modeling module 20 can provide for verified platforms to be utilized in generating linear models, such as gPROMS® which is a tested product for model development. This further can eliminate the need for a separate phase to convert the developed models or algorithms to C/C++, which reduces the product cycle development efforts. The use of coordination module 50 allows a convenient architecture to have multiple computer nodes for loading and/or installing any required software.

The use of the real-time environment of the coordination module 50 to initiate modeling/controller tasks allows a simplified procedure for changing the underlying components that complete these tasks. For example, a gPROMS® modeling task can be replaced with a customized application at a later stage without making major modifications to the existing architecture because the modeling tool 22 alone can be replaced, such as the lineariser 22 shown in FIG. 2, rather than replacing the entire control system 10 or even the entire modeling module 20. Similarly, for example, controller algorithms in MATLAB® can be replaced with a RMPCT engine with only a software change.

The present disclosure contemplates the use of a computer system within which a set of instructions, when executed, may cause the machine to perform any one or more of the methodologies discussed above. The computer instructions can be embodied in a storage medium. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, the term "machine" shall be taken to include a single machine or any collection of machines that individually or jointly execute a set (or multiple sets) of instructions to perform any one or more of the methodologies discussed herein.

The computer-readable storage medium can have stored thereon one or more sets of instructions (e.g., software) embodying any one or more of the methodologies or functions described herein, including those methods illustrated above. The computer-readable storage medium can be an electromechanical medium such as a common disk drive, or a mass storage medium with no moving parts such as Flash or like non-volatile memories. The instructions may also reside, completely or at least partially, within a main memory, a static memory, and/or within a processor during execution thereof by the computer system. The main memory and the processor also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present disclosure contemplates a machine readable medium containing instructions, or that which receives and executes instructions from a propagated signal so that a device, such as connected to a network environment can send or receive data, and to communicate over the network using the instructions.

While the computer-readable storage medium can be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method of controlling a non-linear process performed by a processing system comprising a processor and a non-transitory computer-readable storage medium, the method comprising:

providing a model based at least in part on the non-linear process, the model being provided by a modeling module of a control system;

providing controller algorithms associated with control devices of the non-linear process, the controller algorithms being provided by a computational module of the control system;

presenting on a user interface controller information based at least in part on the model and the controller algorithms, the user interface being provided by a user interface module;

placing the modeling module, the computational module and the user interface module in communication using a separate coordination module of the control system operably coupled to the modeling module, the computational module and the user interface module;

and controlling the non-linear process by sending one or more control signals from the separate coordination module to at least one of the control devices, wherein the controlling comprises the separate coordination module receiving updated information comprising at least one of an updated controller algorithm from the computational module or an updated model from the modeling module, the separate coordination module performing at least one modeling function for said non-linear process using the updated data selected from optimizing, predicting and linearizing, and adjusting the control signals based on results from the performing of the modeling function.

2. The method of claim 1, wherein the model is a linear model or a piecewise linear model.

3. The method of claim 2, wherein the model is generated by the modeling module.

4. The method of claim 1, wherein the modeling module and the computational module operate using different application platforms.

5. The method of claim 1, further comprising the step of replacing the model with another model generated by another modeling module, wherein the modeling module is replaced by the another modeling module, and wherein the another modeling module is placed in communication with the computational module and the user interface module using the coordination module of the control system.

6. The method of claim 1, further comprising the step of replacing the controller algorithms with other controller algorithms associated with the control devices provided by another computational module, wherein the computational module is replaced by the another computational module, and wherein the another computational module is placed in communication with the modeling module and the user interface module using the coordination module of the control system.

7. The method of claim 1, further comprising the steps of:
monitoring operational parameters associated with the non-linear process;
generating one or more operational variables based at least in part on the operational parameters; and
storing the one or more operational variables in the coordination module.

8. The method of claim 7, wherein the control devices are selected from the group consisting of a valve, a switch, a motor, a heating apparatus, a cooling apparatus, a temperature sensor, a pressure sensor, and any combinations thereof.

9. The method of claim 7, further comprising the step of communicating the one or more operational variables and the control information between the user interface module and the coordination module using an application server.

10. The method of claim 7, wherein the modeling module optimizes the controlling of the non-linear process based at least in part on the one or more operational variables, the model and the controller algorithms.

11. The method of claim 1, wherein the modeling module predicts a state of the non-linear process based at least in part on one or more proposed variables, the model and the controller algorithms.

12. The method of claim 1, wherein the modeling module generates an optimum trajectory for a grade transition of the non-linear process.

13. A control system for controlling processing systems, the control system comprising:
a plurality of control devices operably coupled to a processing system for controlling a non-linear process of the processing system, the processing system comprising a processor and a non-transitory computer-readable storage medium comprising:
a modeling module to provide a model based at least in part on the process;
a computational module to provide controller algorithms associated with the plurality of control devices;
a user interface module to present at a user interface controller information based at least in part on the model and the controller algorithms; and
a separate coordination module for establishing communication between the modeling module, the computational module and the user interface module,
wherein one or more control signals are provided to at least one of the plurality of control devices for the controlling of the process,
wherein the controlling comprises the separate coordination module receiving updated information comprising at least one of an updated controller algorithm from the computational module or an updated model from the modeling module, the separate coordination module performing at least one modeling function for said non-linear process using the updated data selected from optimizing, predicting and linearizing, and adjusting the control signals based on results from the performing of the modeling function; and
wherein the modeling module and the computational module operate using different application platforms.

14. The control system of claim 13, wherein the model is a linear model or piecewise linear model, and wherein the modeling module transforms a non-linear process of the processing system to the linear model or piecewise linear model.

15. The control system of claim 13, wherein said processing system comprises one or more sensors that send operational parameters to the coordination module, wherein one or more operational variables are generated based at least in part on the operational parameters, and wherein the one or more operational variables are stored in the coordination module.

16. The control system of claim 15, wherein the modeling module optimizes the controlling of the processing system based at least in part on the one or more operational variables, the model and the controller algorithms, and wherein the modeling module predicts a state of the processing system based at least in part on one or more proposed variables, the model and the controller algorithms.

17. The control system of claim 15, wherein the control devices are selected from the group consisting of a valve, a switch, a motor, a heating apparatus, a cooling apparatus, and any combinations thereof.

18. A non-transitory computer-readable storage medium comprising computer-readable program instructions for controlling a non-linear process, said program instructions comprising:
program instructions for causing a computer to query a modeling module for a model of the non-linear process;
program instructions for causing said computer to query a computational module for controller algorithms associated with one or more control devices of the non-linear process;
program instructions for causing said computer to present on a user interface controller information based at least in part on the model and the controller algorithms;
program instructions for placing the modeling module, the computational module and the user interface module in communication with a separate coordination module operably coupled to the modeling module, the computational module and the user interface module; and program instructions causing said computer to send one or more control signals to at least one of the one or more control devices to implement control of the non-linear process, wherein controlling the non-linear process comprises the separate coordination module receiving updated information comprising at least one of an updated controller algorithm from the computational module or an updated model from the modeling module, the separate coordination module performing at least one modeling function for said non-linear process using the updated data selected from optimizing, predicting and linearizing, and adjusting the control signals based on results from the performing of the modeling function.

19. The storage medium of claim 18, further comprising:
program instructions for causing said computer to generate a reference trajectory for a grade transition for the non-linear process, wherein the model is a linear model or piecewise linear model.

20. The storage medium of claim 18, further comprising:
program instructions for causing said computer to store one or more operational variables in a coordination module, wherein the operational variables are generated based at least in part on operational parameters sensed by one or more sensors operably coupled to the non-linear process; and program instructions for causing said computer to perform at least one of optimization and prediction, wherein optimization comprises optimizing the control of the non-linear process based at least in part on the one or more operational variables, the model and the controller algorithms, and wherein prediction comprises predicting a state of the non-linear process based at least in part on one or more proposed variables, the model and the controller algorithms.

* * * * *